Aug. 6, 1940.   R. SCHWEIGHART   2,210,183
SILVERWARE CHEST
Filed March 18, 1938
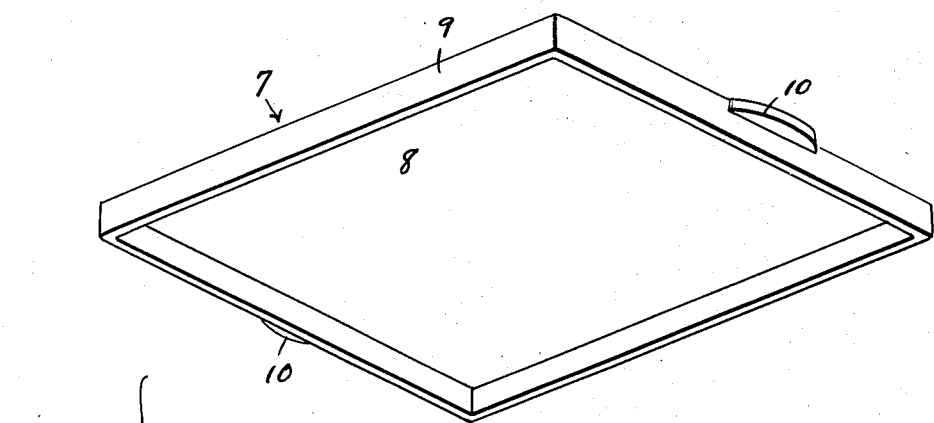
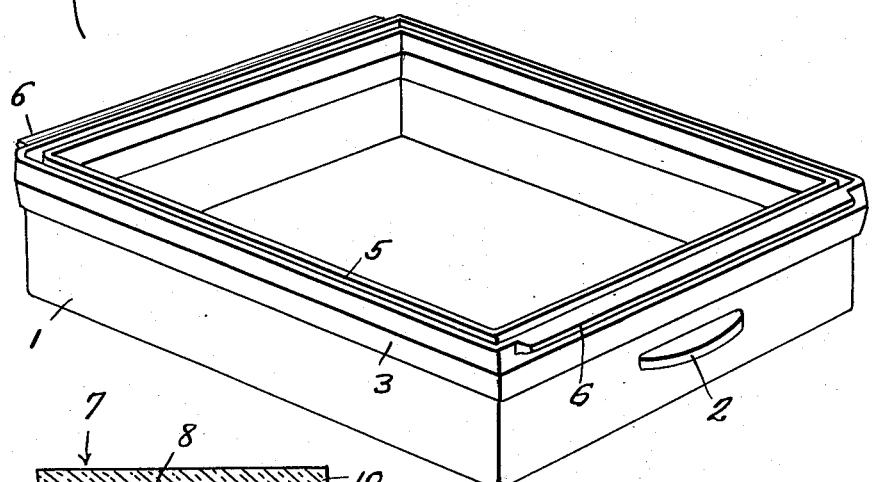
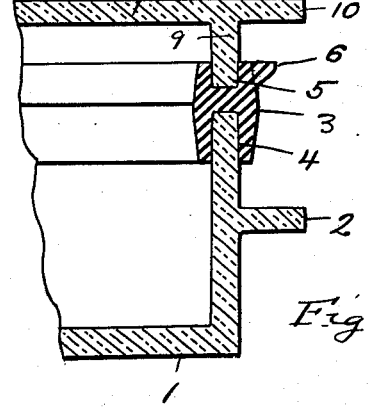
Inventor
Raymond Schweighart
By Clarence A. O'Brien
Hyman Berman
Attorneys Patented Aug. 6, 1940

2,210,183

UNITED STATES PATENT OFFICE 2,210,183

SILVERWARE CHEST

Raymond Schweighart, Humboldt, Ill.

Application March 18, 1938, Serial No. 196,760

1 Claim. (Cl. 215—1)

The present invention relates to new and useful improvements in silverware chests and has for its primary object to provide, in a manner as hereinafter set forth, a device of this character of transparent material and including a removable cover but which, when closed, will be substantially air and moisture proof, thus preventing tarnishing of the contents.

Other objects of the invention are to provide a silverware chest of the aforementioned character which will be comparatively simple in construction, durable, compact, light in weight, attractive in appearance and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a perspective view of a silver chest constructed in accordance with the present invention, showing the cover separated therefrom.

Figure 2 is a view in vertical longitudinal section through an end portion of the device.

Referring now to the drawing in detail, it will be seen that the embodiment of the invention which has been illustrated comprises a substantially rectangular tray 1 of suitable transparent material, preferably glass. On its ends, the tray 1 is provided with integral handles 2. Of course, the tray 1 may be of any suitable dimensions.

Mounted on the upper edge of the tray 1 is a rubber sealing gasket 3 of substantially the cross sectional shape shown to advantage in Fig. 2 of the drawing. The sealing gasket 3 has formed in its lower edge a groove or channel 4 for the reception of the tray 1. In its upper portion, the gasket 3 is provided with a comparatively shallow groove or channel 5 the purpose of which will be presently set forth. On its end portions the rubber gasket 3 is provided with integral lips or the like 6 to facilitate mounting said gasket on the tray 1.

The reference numeral 7 designates generally a removable cover for the tray 1. The removable cover 7 is also of suitable transparent material, preferably glass, and comprises a top 8 having a depending marginal flange 9 which is engaged in the groove or channel 5 of the gasket 3. On its ends, the cover 7 is provided with integral handles 10 which are substantially similar to the handle 2 of the tray 1.

The construction and arrangement is such that, when the cover 7 is in position with the depending flange 9 thereof engaged in the groove 5 of the gasket 3, the chest will be substantially air and moisture proof, thus preventing tarnishing of the silverware in said chest. Being entirely transparent, with the exception of the sealing gasket 3, the silverware in the chest may be attractively displayed. The rubber gasket 3 may be expeditiously removed for replacement when desired.

It is believed that the many advantages of a silverware chest constructed in accordance with the present invention will be readily understood and although a preferred embodiment of the device is as illustrated and described, it is to be understood that changes in the details of construction may be resorted to which will fall within the scope of the invention as claimed.

What is claimed is:

A silverware chest comprising a substantially rectangular glass tray, a resilient rubber sealing gasket of rectangular shape and removably mounted on the upper edge of the tray and having formed in its lower portion a comparatively deep substantially U-shaped groove for the reception of the upper edges of the tray for frictionally securing said gasket thereon, said resilient gasket further having a comparatively shallow, substantially U-shaped groove in its upper portion, a flange formed on each end member of the gasket, each flange being of slightly less length than the length of said end member and extending outwardly from the upper edge of the outer wall of said end member and a removable cover for the tray, said cover including a depending marginal flange engageable in the second named groove and outwardly extending handles on the end members of the cover slightly spaced above the flanges of the gasket for facilitating removal of the gasket with the cover.

RAYMOND SCHWEIGHART.